March 22, 1960

F. HAVELKA 2,929,985

METHOD AND A DEVICE FOR MEASURING THE WALL THICKNESS
OF ARTICLES MADE OF FERROMAGNETIC MATERIALS

Filed Sept. 9, 1957

INVENTOR.
František Havelka
BY Michael S. Striker
ATTORNEY

March 22, 1960   F. HAVELKA   2,929,985
METHOD AND A DEVICE FOR MEASURING THE WALL THICKNESS
OF ARTICLES MADE OF FERROMAGNETIC MATERIALS
Filed Sept. 9, 1957   2 Sheets-Sheet 2

INVENTOR.
František Havelka
BY Michael S. Striker
ATTORNEY

United States Patent Office 2,929,985
Patented Mar. 22, 1960

2,929,985

METHOD AND A DEVICE FOR MEASURING THE WALL THICKNESS OF ARTICLES MADE OF FERROMAGNETIC MATERIALS

Frantisek Havelka, Prague, Czechoslovakia

Application September 9, 1957, Serial No. 682,932

Claims priority, application Czechoslovakia October 25, 1956

4 Claims. (Cl. 324—34)

The present invention relates to a method and a device for measuring the wall thickness of articles made of ferromagnetic materials.

It is frequently necessary to measure the wall thickness of articles made of ferromagnetic material, e.g. iron tubes, where the wall is accessible from one side only while any damage to the material has to be avoided.

This occurs when checking pipe systems of steam boilers, where a great number of points has to be quickly measured and pipes ascertained, the walls of which have been weakened by corrosion.

The determination of faulty points is made difficult by rough conditions in which the operation is carried out and further by the coarse surface of the pipes often corroded and covered with a deposit of fly ash and slag.

The usual methods of supersonic measurements and processes employing X- or gamma-rays are unsuitable for such purposes, since they require a suitable adjustment of the surface, apart from the considerable tediousness of the operation. The same applied to various methods of magnetic measurement used when ascertaining defects in materials on a magnetic principle, based on the evaluation of intensity of magnetic fields; such methods cannot be applied in these cases, because the intensity of the magnetic field in the interior of the measured material cannot be determined with certainty because of the coarse and dirty surface of the pipes.

It is an object of the present invention to provide a method and a device which permit the measurement of the wall thickness of articles made of ferromagnetic materials, while eliminating all the above drawbacks.

The principle of the invention is based on the following phenomenon:

If a sinusoidal alternating magnetic field is produced by an outer source in a ferrous material eddy currents are induced in the material which has a certain electric conductivity.

These eddy currents influence the size and direction of the vector (phase) of the alternating magnetic field inside the conductive material. The said two values change continuously in the direction from the surface of the material on the one hand in dependence on the qualities of the material i.e. its conductivity and permeability, and on the other hand in dependence on the total thickness of the measured wall.

If the thickness of the material in the area being measured is designated by $d$, its conductivity by $\sigma$, its permeability by $\mu$ and the frequency of the applied field by $f$, then, according to an established theory, the phase angle or phase difference between the vector of the magnetic pulsating field which exists closely below the surface of the measured object and the vector of the pulsating magnetic flux which passes through the entire thickness of the measured object or wall and determining the position of the last mentioned vector, is expressed by the following equation:

$$\Delta\varphi = \text{arc tan} \frac{\exp \alpha \cdot d - \sin \alpha \cdot d - \cos \alpha \cdot d}{\exp \alpha \cdot d + \sin \alpha \cdot d - \cos \alpha \cdot d}$$

wherein $\alpha = 1.98 \cdot 10^{-3}\sqrt{\sigma \cdot \mu \cdot f}$ and wherein exp means exponential function of the basis $e$, or $\exp \alpha \cdot d = e^{\alpha \cdot d}$.

It is known that the intensity of a magnetic field which extends in parallel direction with respect to a line or plane which constitutes the boundary between two materials of different permeabilities joining each other, changes continuously and not abruptly at the transition of the field from one of the materials into the other one, i.e. the vector of the magnetic field existing close to the surface of the object inside thereof has the same magnitude and direction as the vector of the magnetic field close to the surface of the measured material outside thereof. At points distant from the surface of the measured object the above mentioned magnetic field is complemented by external leakage or stray fields which are present in the air, the predominantly strongest one of these stray fields being that of the electromagnet used in the process and which causes the magnetic field within the wall of material to be measured. Therefore, it is necessary to eliminate the effects of the external stray fields which is done according to the invention by means of a suitable shield which is located closely adjacent to the portion of the material to be measured. In this manner, the portion of the material which is being measured is shielded against external stray fields so that in the entire area of the thus shielded space only the above mentioned magnetic field remains which at all times is identical with or proportional to the magnetic field which exists closely below the surface of the measured portion of the material.

If the low frequency alternating magnetic field, produced in the measured wall is suitably screened off at the point of measurement, the influence of the eddy currents becomes evident by a phase shift of the produced magnetic field at the measured point with respect to the producing magnetic field. This phase shift is made use of in the method according to the invention for measuring the wall thickness of articles made of ferromagnetic materials. The new method permits the measurement even of materials, the surface of which is coarse and dirty and where the magnitude of intensity of the magnetic field produced inside the material cannot be ascertained or defined.

In contrast to the hitherto known methods of magnetic measurement of material flaws, which are based on the evaluation of the intensity of magnetic fields, the method according to the invention employs a new way in which the determination of the wall thickness is carried out on the basis of the phase difference between the vector of the producing magnetic field and the vector of the produced magnetic field.

The method according to the invention may be used with advantage for measuring purposes in cases similar to those quoted above, by means of a device, which forms also part of the present invention.

The invention also comprises novel details of construction and novel combinations and arrangements of parts, which will more fully appear in the course of the following description. However, the drawings merely show and the following description merely describes preferred embodiments of the present invention, which are given by way of illustration or example only.

Figure 1:
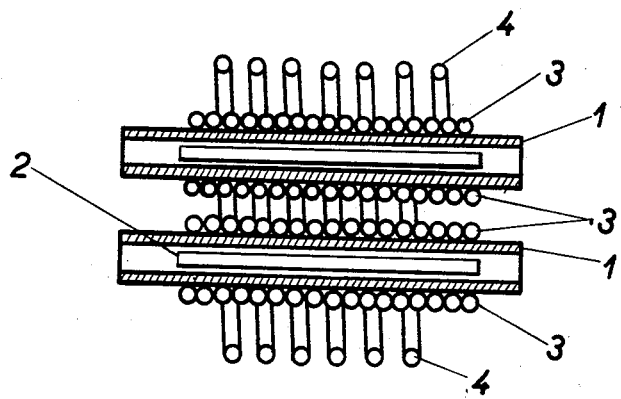
Fig. 1 shows in a diagrammatic sectional view a sounding member.

The device according to the invention employs a known sounding member substantially made of material known by the trade name "Permalloy," shown in Fig. 1.

Inserted in a capillary glass tube 1 is a Permalloy core 2, a coil 3 being wound on the tube 1. Two such members are connected in series with directions of winding of the coils 3 opposed to each other and a coil 4 is wound round the whole assembly.

When alternating current of a medium or higher frequency flows through the coils 3, no voltage is induced on the terminals of the coil 4 because the effects of the two coils 3 eliminate each other owing to the reversed winding.

When the whole sounding member just described is placed into a magnetic field, an electromotive force of double frequency will be induced in the winding 4 by the influence of oversaturation of the Permalloy cores, the magnitude of the electromotive force being within certain limits and, depending upon a suitably chosen current in the coils 3, proportional to the magnitude of magnetic field in which the sounding member is placed and in phase therewith.

Figure 2:
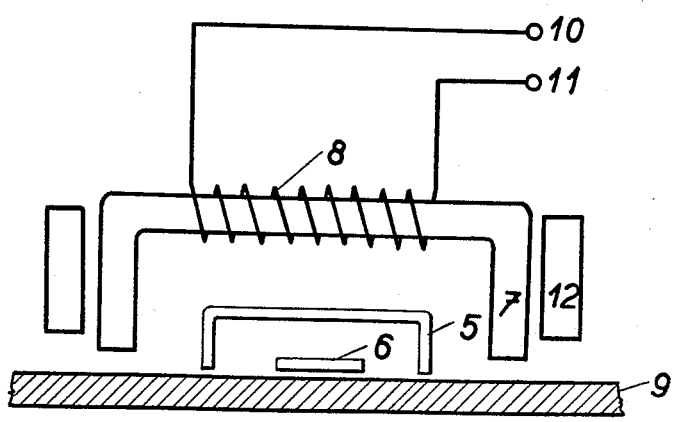
Fig. 2 shows by way of example the use of the sounding member in a diagrammatic sectional view.

An example of the use of a Permalloy sounding member is shown diagrammatically in Fig. 2. A yoke 7 consisting of laminations of transformer sheet metal represents an electromagnet by means of which an alternating magnetic field is generated in the measured article 9 by means of alternating current flowing through a coil 8. Inserted between the poles of the electromagnet 7, 8 is a shielding cover 5 in which the Permalloy sounding member 6 is housed.

The magnetic field appearing close below the surface is, in accordance with physical laws, substantially identical with the field closely above the surface of the measured article 9. When the surface of the measured place is suitably shielded against the leakage field of the electromagnet 7, 8, e.g. by a shield or cover 5 surrounding the sounding member 6 and resting together with the latter closely against the measured surface, no outer magnetic field will be present underneath said cover, but there will remain only the alternating magnetic field extending close to the surface of the measured article.

According to the invention the phase shift between the alternating magnetic field extending close to the surface of the measured article and the alternating field of the electromagnet 7, 8 which produces this shielded field, is used for the measurement. It follows from theoretical considerations as well as from experience, that in a certain material this phase shift depends on the thickness of the wall material lying underneath the sounding member.

Figure 3:
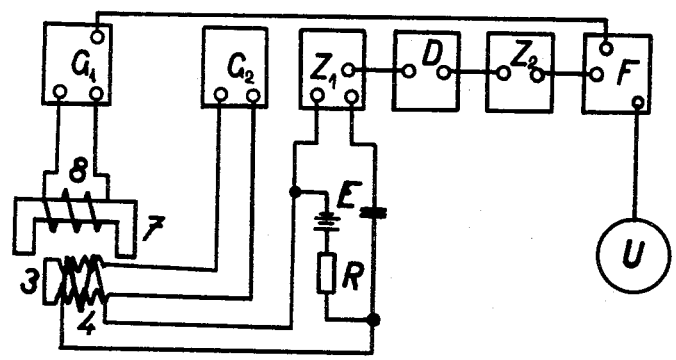
Fig. 3 shows a block diagram of the device.

In Fig. 3 the reference $G_1$ represents a generator which produces sinusoidal alternating current of low frequency. This current feeds the magnetizing coil 8 of the electromagnet 7 so as to establish a primary magnetic field.

A further generator $G_2$ produces alternating current of a several times higher frequency than the generator $G_1$. This current is fed to the coils 3 of the sounding member according to Fig. 1. Alternating current of a higher frequency is induced (in view of the magnetic field in which the sounding member 6 is located) at the terminals of the indication coil 4 of the sounding member and this frequency furnished by $G_1$ is then modulated by the low frequency which passes through the coil 8 of the electromagnet 7 the phase of said modulation being shifted against that of the low frequency passing through coil 8 to the same degree as the phase of the field in the shielded portion of the article with respect to the field produced by coil 8.

In order to render the modulation of this alternating voltage of higher frequency unequivocal, it is necessary to place the sounding member into a permanent unidirectional magnetic field. This field must be at least so powerful that the total magnetic field produced by the addition of the unidirectional component and alternating low frequency component which has to be measured, should never drop to zero.

According to the invention the superposition of the unidirectional and alternating magnetic fields may be carried out in various ways, e.g. such that the alternating current serving for exciting the electromagnet 7 according to Fig. 2 has a unidirectional component which produces the required unidirectional component of the magnetic field below the indication member 6 or one or more permanent magnets 12 are placed in the vicinity of the electromagnet 7 as represented in Fig. 2 or a source of direct current, denoted with E in Fig. 3, is connected over a suitably high resistance R to the supply line leading to the coil 4 of the sounding member according to Fig. 1.

The alternating voltage of a higher frequency which has been produced at the terminals of the coil 4 of the sounding member and has been modulated by the low frequency alternating voltage $e_2$ passing through coil 8 is fed to an amplifier $Z_1$, where it is amplified, whereupon it is supplied to a demodulator D, in which it is demodulated leaving a low frequency voltage $e_4$ of same frequency as $e_2$ but possibly shifted in phase.

From the demodulator D emanates a low frequency alternating voltage $e_4$ the phase shift of which with respect to the low frequency applied to coil 8 has to be measured. This voltage $e_4$ is fed to a further amplifier $Z_2$ and hence to a phase discriminator F which is also connected to the generator $G_1$. The selection amplifier $Z_2$ is tuned to the low frequency $e_2$ which is supplied by the generator $G_1$. The purpose of this arrangement is to eliminate the higher harmonics which would interfere with further measurements.

The low frequency sinusoidal voltage $e_4$ is transmitted from the amplifier $Z_2$ to the above mentioned phase discriminator F. In this discriminator there is effected the comparison of the phase of the said low frequency sinusoidal voltage $e_4$ with the phase of the low frequency magnetizing current voltage $e_2$ which is produced by the generator $G_1$ and is applied to the coil 8 of the electromagnet 7. The measuring of the phase is effected by the indication of a direct current galvanometer U, the graduation of which may be divided and marked to indicate millimeters. The indication thereof corresponds then to the thickness of the measured wall or material.

Figure 4:
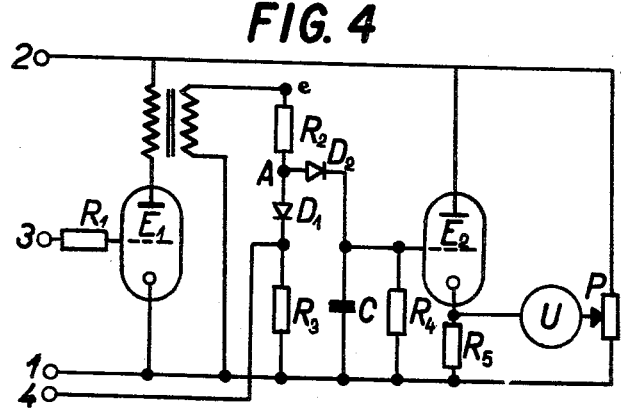
Fig. 4 shows an example of a phase discriminator used in the device and Fig. 5 represents the course of voltage and current produced by the apparatus.

The phase discriminator F is shown by way of example in Fig. 4. From the amplifier $Z_2$ according to Fig. 4 there is supplied to the terminals 1 and 3 the amplified low frequency voltage $e_4$, the phase of which has to be compared with the phase of the original low frequency magnetizing voltage $e_2$. The terminal 1 is connected to the cathode of the amplifying tube $E_1$ and the terminal 3 to the grid of this tube over a high resistance $R_1$, which causes the grid to follow only the negative halfwave of the sinusoidal voltage $e_4$ present at the terminal 3.

This is due to the fact that, as soon as the voltage $e_4$ at the terminal 3 exceeds the zero value, a voltage drop takes place across the resistance $R_1$ on account of the produced grid current and the grid of the tube $E_1$ remains at zero potential during the whole duration of the positive half wave. During this period a constant current will flow through the primary winding of the transformer Tr, said constant current corresponding to the zero potential of the grid. As soon as the voltage $e_4$ at the terminal 3 differs from zero in negative direction, the grid current ceases instantaneously and the grid potential follows to the full value the negative half wave of the sine curve.

As the maximum values of the amplified low frequency alternating current vary within the range from tens to several hundreds of volts, the anode current flowing through the transformer Tr ceases immediately as soon as the grid potential drops by a few volts in negative direction. During the entire following half-cycle the anode current remains at zero value, until the moment, when the grid potential of the tube $E_1$ reaches again a value around zero.

Figure 5:
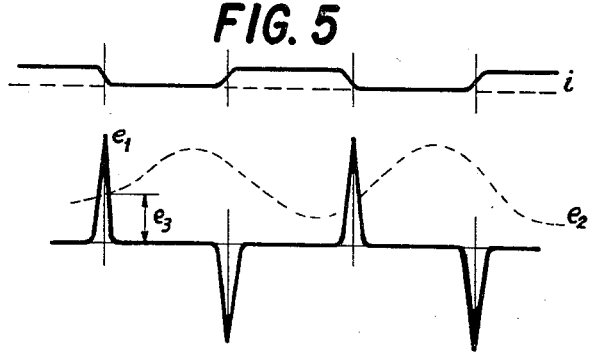

The course of the anode current of the tube $E_1$ which flows through the primary winding of the transformer Tr, is marked with the letter $i$ in the top portion of Fig. 5.

The anode current has a trapezoidal course with very steep sides, the sudden drop of the anode current taking place just at the moment, when the sinusoidal voltage $e_4$ between the terminal 3 and the terminal 1 according to Fig. 4 passes through zero.

The sudden drop of the anode current results in a high voltage peak being induced in the secondary winding of the transformer Tr. This voltage peak which occurs at the moment, when the voltage on the terminal 3 passes through zero, is shown in the lower part of Fig. 5 and marked $e_1$. The terminal 4 according to Fig. 4 receives the original voltage $e_2$ of the generator $G_1$ shown in Fig. 3 with the phase of which the phase of the low frequency alternating current $i$ has to be compared, the latter having been produced by the magnetic field in which the sounding member 6 according to Fig. 2 is placed.

The course of the original voltage $e_2$ is represented in the lower part of Fig. 5 by the wave-line $e_2$ as being phase-shifted against $i$ and $e_1$.

When the voltage $e_1$, i.e. the voltage peaks at the terminals of the secondary winding of the transformer Tr, reaches the value $e_2$, current starts to flow through the diode $D_1$, said current causing such a drop on the high resistance $R_2$, that the voltage at the junction point A according to Fig. 4 remains at the value $e_3$ until the voltage $e_1$ returns to the value $e_3$, i.e. the peak voltage which has been produced in the secondary winding of the transformer Tr is cut off to the value $e_3$, which just at this moment is equal to the voltage $e_2$ at the terminal 4 shown in Fig. 4.

The value $e_3$ depends exclusively on the phase shift of the alternating voltage $e_4$, which is present at the terminal 3, with respect to the original alternating voltage $e_2$ at the terminal 4 according to Fig. 4, i.e. depends on the phase of the outer alternating low frequency magnetic field and depends therefore also on the phase of the alternating magnetic field appearing inside the measured material below shield 5, because the said voltage $e_4$ has been derived from this magnetic field.

When the phase shift of this magnetic field changes with respect to that of the alternating voltage supplied by the generator $G_1$ shown in Fig. 3, the peak voltage $e_3$ only is changed, if care is taken to prevent a change of the course of voltage $e_2$ on the terminal 4. This may be easily effected by stabilizing the voltage of the generator $G_1$.

From the foregoing it is evident, that provided conditions are adjusted so as to cause the peak voltages $e_1$ to be produced at the moment when $e_2$ passes through its mean value, the changes in the phase shift will be directly proportional to the changes of the cut-off peaks $e_3$.

The said peaks serve now to charge a condenser C over a diode $D_2$ according to Fig. 4. The time constant of the time circuit $R_4C$ has a high value in an order which is higher than the order of the reciprocal value of the frequency of the alternating current supplied by the generator $G_1$, shown in Fig. 3.

Consequently, the potential at the condenser C and at the grid of the tube $E_2$ connected therewith, is stabilized at a medium value, which is close to the peak voltage $e_3$. This value will therefore depend exclusively on the phase shift of the alternating magnetic field, which appears inside the measured article with respect to the producing alternating field appearing adjacent the surface at the measured place.

The tube $E_2$ according to Fig. 4 is connected as cathode-follower and the anode current thereof produces across the cathode resistance $R_5$ a drop, the amount of which depends only on the sought phase shift.

By means of the slidable top of the potentiometer P which is connected with one of its ends to the terminal 1 (ground) and with its other end to the positive terminal of a source of electrical energy furnishing the anode voltage at the terminal 2, a suitable voltage may be adjusted corresponding to the value $e_3$ in such a way, that a moving coil galvanometer U, the scale of which may be empirically graduated to indicate directly millimeters indicates the thickness of the measured wall or material.

I claim:

1. A device for measuring the thickness of a layer of ferromagnetic material, comprising, in combination, electrical means for producing an alternating magnetic field in a layer of ferromagnetic material located adjacent said electrical means; shield means for shielding a portion of said layer of material against magnetic stray fields including those created by said electrical means, without affecting the magnetic field in said portion; sounding means located adjacent to said portion of said layer and shielded by said shield means, said sounding means being capable of furnishing an indication of the magnetic field existing in said portion of said layer; and phase-comparator means connected in circuit with said electrical means and with said sounding means for measuring any existing phase difference between said magnetic field produced by said electrical means, and said magnetic field in said shielded portion of said layer, such phase difference being indicative of the thickness of said portion of said layer of ferromagnetic material.

2. A device for measuring the thickness of a layer of ferromagnetic material, comprising, in combination electrical means for producing an alternating magnetic field in a layer of ferromagnetic material located adjacent to said electrical means, said electrical means including generator means for generating an alternating current, an electromagnet excited by said alternating current and means for preventing said alternating magnetic field from decreasing to zero value; shield means for shielding a portion of said layer of material against magnetic stray fields including those created by said electrical means, without affecting the magnetic field in said portion; sounding means, located adjacent to said portion of said layer and shielded by said shield means, said sounding means being capable of furnishing an indication of the magnetic field existing in said portion of said layer; and phase-comparator means connected in circuit with said electrical means and with said sounding means for measuring any existing phase difference between said magnetic field produced by said electrical means, and said magnetic field in said shielded portion of said layer, such phase difference being indicative of the thickness of said portion of said layer of ferromagnetic material.

3. A device for measuring the thickness of a layer of ferromagnetic material, comprising, in combination, electrical means for producing an alternating magnetic field in a layer of ferromagnetic material located adjacent to said electrical means, said electrical means including generator means for generating an alternating current, an electromagnet excited by said alternating current and permanent magnet means located adjacent to said electromagnet for preventing said alternating magnetic field from decreasing to zero value; shield means for shielding a portion of said layer of material against magnetic stray fields including those created by said electrical means, without affecting the magnetic field in said portion; sounding means located adjacent to said portion of said layer and shielded by said shield means, said sounding means being capable of furnishing an indication of the magnetic field existing in said portion of said layer; and phase-comparator means connected in circuit with said electrical means and with said sounding means for measuring any existing phase difference between said magnetic field produced by said electrical means, and said magnetic field in said shielded portion of said layer, such phase difference being indicative of the thickness of said portion of said layer of ferromagnetic material.

4. A device for measuring the thickness of a layer of ferromagnetic material, comprising, in combination, electrical means for producing an alternating magnetic field in a layer of ferromagnetic material located adjacent to said electrical means, said electrical means including a first generator means for generating a first alternating current, and an electromagnet excited by said alternating current; shield means for shielding a portion of said layer of material against magnetic stray fields including those created by said electrical means, without affecting the magnetic field in said portion; sounding means, located adjacent to said portion of said layer and shielded by said shield means, said sounding means being capable of furnishing an indication of the magnetic field existing in said portion of said layer, said sounding means comprising high permeability core means, first coil means adapted to be supplied with a second alternating current, and second coil means for generating a third alternating current of a frequency higher than that of said second alternating current; second generator means connected to said first coil means for generating said second alternating current at a frequency at least five times the frequency of said first alternating current; means for supplying additionally said second coil means with direct current of sufficient strength to prevent said alternating magnetic field from decreasing to zero; and phase-comparator means connected in circuit with said electrical means and with said sounding means for measuring any existing phase difference between said magnetic field produced by said electrical means, and said magnetic field in said shielded portion of said layer, such phase difference being indicative of the thickness of said portion of said layer of ferromagnetic material.

References Cited in the file of this patent
UNITED STATES PATENTS

| | | |
|---|---|---|
| 2,098,991 | Zuschlag | Nov. 16, 1937 |
| 2,455,792 | Meunier | Dec. 7, 1948 |
| 2,489,920 | Michel | Nov. 29, 1949 |
| 2,758,276 | Foerster | Aug. 7, 1956 |
| 2,790,140 | Bender | Apr. 23, 1957 |